United States Patent [19]

Denny

[11] Patent Number: 4,855,557
[45] Date of Patent: Aug. 8, 1989

[54] ELECTRICAL DISCHARGE MACHINING ELECTRODE

[75] Inventor: Herman C. Denny, Rural Hall, N.C.
[73] Assignee: Westinghouse Electric Corp., Pittsburgh, Pa.
[21] Appl. No.: 131,705
[22] Filed: Dec. 11, 1987
[51] Int. Cl.[4] .......................... B23H 9/14; B23H 1/04
[52] U.S. Cl. ................................................. 219/69.15
[58] Field of Search ................ 219/69 E, 69 D, 69 V; 204/280

[56] References Cited

U.S. PATENT DOCUMENTS

| | | | |
|---|---|---|---|
| 2,422,994 | 6/1947 | Taylor | 425/467 |
| 2,715,172 | 8/1955 | Larkins Jr. | 219/69 E |
| 2,773,968 | 12/1956 | Martellotti et al. | 219/69 E |
| 3,194,938 | 7/1965 | Smith | 219/69 V |
| 3,622,734 | 11/1971 | Mainwaring | 219/69 E |
| 3,727,023 | 4/1973 | Monnich | 219/69 V |
| 4,059,031 | 11/1977 | Erdelyi | 76/108 R |
| 4,628,171 | 12/1986 | Colby et al. | 219/69 V |

FOREIGN PATENT DOCUMENTS

| | | | |
|---|---|---|---|
| 3302041 | 7/1984 | Fed. Rep. of Germany | 219/69 E |
| 848237 | 7/1981 | U.S.S.R. | 219/69 E |
| 1151402 | 4/1985 | U.S.S.R. | 219/69 E |
| 727681 | 4/1955 | United Kingdom | 219/69 E |
| 941058 | 11/1963 | United Kingdom | 219/69 D |

*Primary Examiner*—A. D. Pellinen
*Assistant Examiner*—Geoffrey S. Evans

[57] ABSTRACT

An electrode for forming a hole in a metal part by an electrical discharge machining process, the electrode being provided with a longitudinal flushing bore which extends from the free end of the electrode in the direction of the electrode longitudinal axis and is spaced laterally from the longitudinal axis, at least at the free end, such that electrode material is present on the longitudinal axis at the free end. When a hole is tapped in a metal part by this electrode, the electrode rotates so that no core, or slug, is left in the tapped hole at the end of the machining operation.

3 Claims, 1 Drawing Sheet

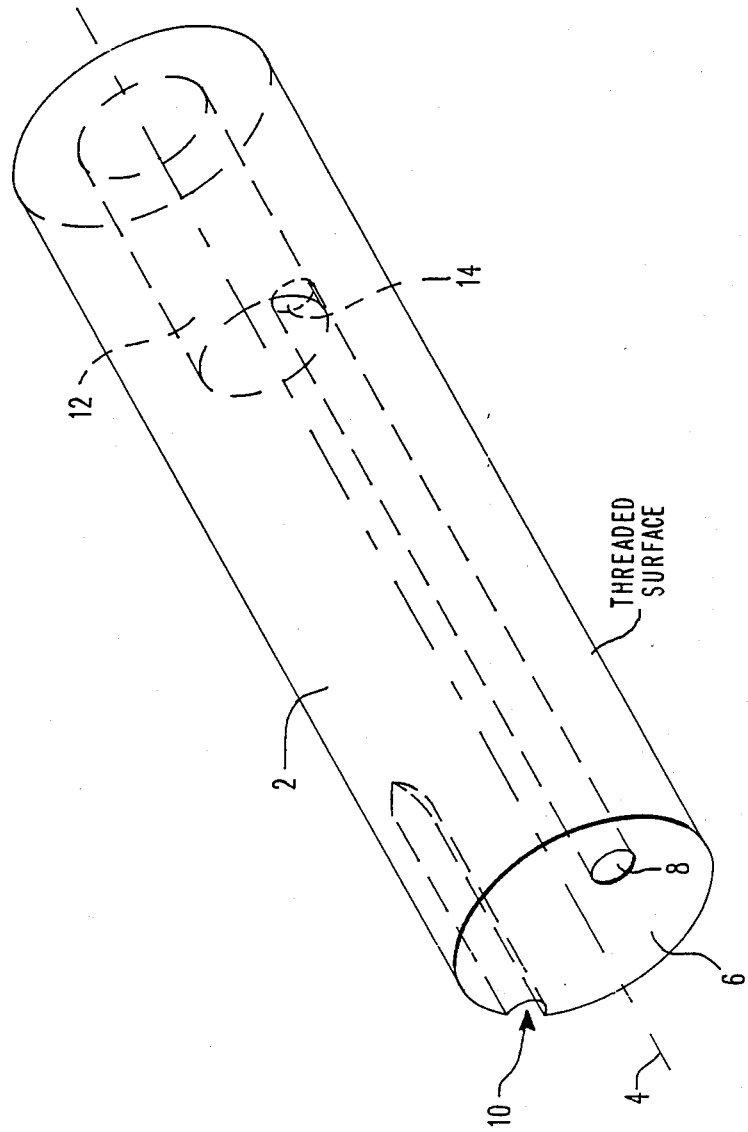

ELECTRICAL DISCHARGE MACHINING ELECTRODE

BACKGROUND OF THE INVENTION

The present invention relates to electrodes or electrode blanks for forming tapped holes by electrical discharge machining.

It is known to form tapped holes in bodies made of hard metal, such as hardened tool steels, by an operation known as electrical discharge machining. In this operation, the tapped hole is formed by advancing a cylindrical electrode whose outer surface has a form corresponding to the thread to be tapped toward the metal part so that the electrode and the part are initially separated by a small gap which is filled with an insulating fluid, such as oil or water. The cutting or threading process takes place in a tank and the electrode and part to be machined are connected to the terminals of a DC source via appropriate conductors so that the desired potential exists therebetween.

The electrode is then caused to advance toward the part, while being rotated at a rate correlated with the rate of forward feed to produce a screwing motion and when the gap between the electrode and the part decreases below a given value, an arc is formed between the electrode and the part, causing erosion of the metal directly adjacent the electrode. While the arc is maintained, the electrode is advanced into the part, while continuing to be rotated, thereby creating a threaded bore in the part. The movements of the electrode is imparted by a hydraulic motor attached thereto and the rate of feed produced by the hydraulic motor is controlled by spark feedback through a machine control.

Various machines for carrying out this operation are already available on the market, one such machine being marketed by the Easco-Sparcatron Company of Whitmore Lake, Michigan, under the Trademark Spark-Matic, Model ES-162.

The electrodes can be of graphite, a copper-tungsten alloy, or any other composition known to be usable for such component. One suitable type of graphite is sold under the designation Grade KK-10. Suitable electrodes are marketed by Airco-Speers.

During a tapping operation, it is necessary to flush material being removed from the hole being formed. For this purpose, known electrodes are provided with a flushing bore concentric with the axis of the electrode. Since the electrode is being rotated about its axis, the result is that metal located along the axis of the electrode is not removed and remains, in the form of a core, in the tapped hole at the end of the machining operation. It is necessary to perform a subsequent operation to remove that core.

Moreover, since the core lies within the flushing bore, and thus partially blocks that bore, the flow of flushing liquid is impeded. The liquid must then be supplied at a sufficiently high pressure to offset this partial blockage.

SUMMARY OF THE INVENTION

It is an object of the present invention to eliminate the above-noted drawbacks of such machining operations.

A more specific object of the invention is to avoid the formation of such a core in a hole being machined, and thus eliminate the need for a subsequent core removal step.

Yet another object of the invention is to facilitate the flow of flushing liquid through the hole being formed, and thus permit a reduction in the flushing liquid supply pressure.

The above and other objects are achieved, according to the present invention, by an electrode for forming a hole in a metal part by an electrical discharge machining process, the electrode having a free end, a cylindrical cross-section, a longitudinal axis, and a longitudinal flushing bore which extends in the direction of the longitudinal axis and is spaced laterally from the longitudinal axis, at least at the free end of the electrode, such that electrode material is present on the longitudinal axis at the free end.

Since the flushing bore, at least at the free end of the electrode, is spaced laterally from the longitudinal axis of the electrode, and the electrode is rotated about the longitudinal axis as it advances into the part being machined, any core which tends to form in the flushing bore is swept away by the remainder of the free end of the electrode, so that a further machining operation to remove a core is not necessary.

Moreover, since any core which tends to form is being constantly removed, the flushing bore is not blocked by a core protruding therein, so that the resistance to flow of flushing liquid is maintained at a minimum.

According to a further object of the invention, at least one longitudinal groove is formed in the periphery of the electrode, starting at the free end thereof, and extending at least a certain distance along the length of the electrode, to provide a return path for flushing liquid.

BRIEF DESCRIPTION OF THE DRAWING

The FIGURE is a perspective view, in simplified form, of a preferred embodiment of an electrode according to the invention.

DESCRIPTION OF THE PREFERRED EMBODIMENTS

The FIGURE shows an electrode 2 according to the invention having the form an elongated cylinder with a longitudinal axis 4 and a free end 6 via which electrode 2 will be displaced into a hole being formed in a metal part. Such hole may take the form of a blind bore. Typically, the cylindrical surface of electrode 2 will be threaded, at least for a certain distance from free end 6, to correspond to the tapped thread to be formed in the metal part.

According to the invention, the free end 6 of electrode 2 contains electrode material at the location of longitudinal axis 4 and is provided with a laterally offset flushing bore 8 which extends along a part of the length of electrode 2.

In addition, electrode 2 is provided, at its cylindrical peripheral surface, with a groove 10 which may be of semicircular form, extending from free end 6, parallel to axis 4 and along a selected portion of the length of electrode 2.

In order for electrode 2 to be compatible with existing electrical discharge machining equipment, it is provided, at the end opposite its free end, with a feed bore 12 coaxial with axis 4. Feed bore 12 extends at least as far as the rear end of bore 8 and has a diameter such that bores 8 and 12 overlap in a region 14 at which the bores are in fluid flow communication with one another.

In operation, as electrode 2 advances into a metal part while rotating, the free end of bore 8 sweeps over an annular path at the bottom of the hole being tapped, rather than remaining in a fixed location relative to that hole, so that the solid material at free end 6 removes any material which might otherwise be left by bore 8. A similar operation occurs with respect to groove 10.

Other embodiments of the invention can be produced. Thus, for example, bore 8 need not extend parallel to axis 4, but instead can be slightly angled so that its rear end is concentric with supply bore 12. This would provide a larger flow passage between bores 8 and 12.

According to another alternative, two or more flushing bores 8 can be provided, each of these bores being spaced laterally from axis 4, at least at free end 6. Equally, two or more grooves 10 could be provided around the periphery of electrode 2.

Preferably, groove 10 is separated laterally from bore 8 by the greatest possible distance to assure that flushing liquid will flow across the base of the bore being machined to the greatest extent possible. This means that in an embodiment such as shown in the FIGURE, bore 8 is diametrically opposite groove 10, with respect to axis 4.

One electrode which has been manufactured and tested had a diameter of one half inch (1.27 cm) and a thread pitch, on its outer periphery, of 13 threads per inch. Bore 8 had a diameter of 0.48 cm and, at free end 2, the center of bore 8 was offset by 0.32 cm from longitudinal axis 4. Groove 10 had the form of a semicircle with a diameter of 0.48 cm, so that groove 10 penetrated into electrode 2, in the direction perpendicular to axis 4, to a distance of 0.24 cm. Supply bore 12 had a diameter of 0.64 cm. It will be appreciated that other dimensional relations could be employed.

It will be understood that the above description of the present invention is susceptible to various modifications, changes, and adaptations, and the same are intended to be comprehended within the meaning and range of equivalents of the appended claims.

What is claimed is:

1. An electrode for forming a hole in a metal part by an electrical discharge machining process, said electrode having a free end, a cylindrical cross-section, a longitudinal axis and a longitudinal flushing bore which extends from the free end in the direction of the longitudinal axis and is spaced laterally from the longitudinal axis, at least at said free end, such that electrode material is present on the longitudinal axis at said free end, said electrode further having a groove formed at the periphery thereof and extending from said free end, parallel to the longitudinal axis of said electrode over only a portion of the length of said electrode, wherein said groove is disposed diametrically opposite said flushing bore, with respect to said longitudinal axis, and said groove provides a return path for flushing liquid flowing out of said flushing bore.

2. An electrode as defined in claim 1 having a threaded peripheral surface, and being rotatable during the machining process to form a threaded hole in the metal part.

3. An electrode as defined in claim 1 wherein said flushing bore extends along a portion of the length of said electrode, and said electrode is further provided with a supply bore extending from the end of said electrode remote from said free end thereof, coaxial with the longitudinal axis of said electrode, and overlapping said flushing bore so as to establish a fluid flow communication between said supply bore and said flushing bore.

* * * * *